Figure 1:
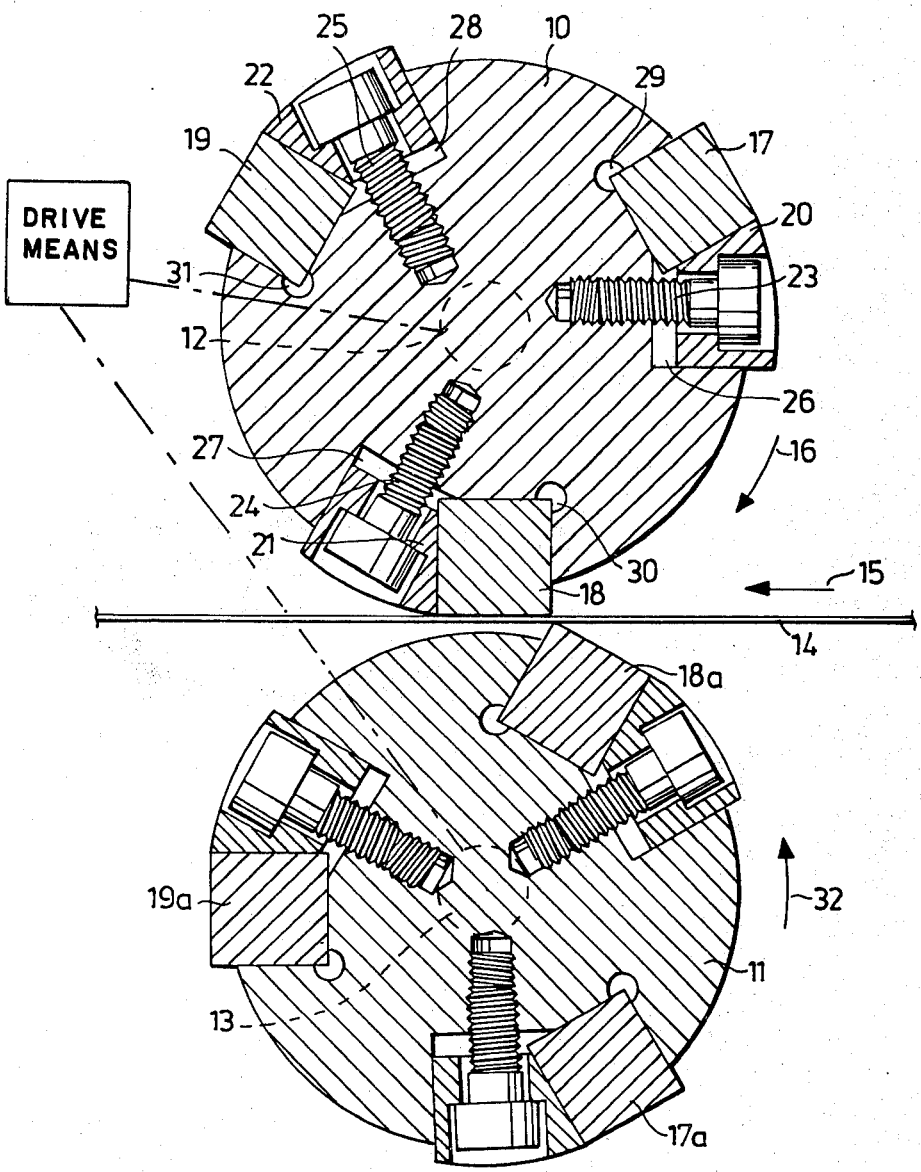

United States Patent [19]

Ivinger

[11] 4,347,959
[45] Sep. 7, 1982

[54] APPARATUS FOR DIVIDING STRIP MATERIAL

[75] Inventor: Kjell E. G. Ivinger, Finspång, Sweden

[73] Assignee: Gränges Aluminium AB, Stockholm, Sweden

[21] Appl. No.: 200,499

[22] PCT Filed: Dec. 17, 1979

[86] PCT No.: PCT/SE79/00252

§ 371 Date: Aug. 19, 1980

§ 102(e) Date: Aug. 15, 1980

[87] PCT Pub. No.: WO80/01259

PCT Pub. Date: Jun. 26, 1980

[30] Foreign Application Priority Data

Dec. 19, 1978 [SE] Sweden .................................. 7813021

[51] Int. Cl.³ .......................... B26F 3/02; B26D 1/62
[52] U.S. Cl. ........................................ 225/97; 83/345;
83/923; 225/4; 225/100; 225/106
[58] Field of Search .................. 83/345, 923; 225/100, 225/106, 4, 5, 97

[56] References Cited

U.S. PATENT DOCUMENTS

| | | | |
|---|---|---|---|
| 1,924,160 | 8/1933 | Knowlton | 83/923 X |
| 2,014,248 | 9/1935 | Evans | 83/923 X |
| 2,203,738 | 6/1940 | Nash | 83/923 X |
| 3,231,164 | 1/1966 | Seidler | 225/106 X |
| 3,605,541 | 9/1971 | Ruben et al. | 83/923 X |
| 3,709,077 | 1/1973 | Trogan et al. | |
| 3,828,636 | 8/1974 | Smith | |
| 4,010,881 | 3/1977 | Wietersheim et al. | 225/100 |
| 4,184,619 | 1/1980 | Stewart et al. | 83/345 X |
| 4,279,369 | 7/1981 | Passafiume | 225/106 X |

*Primary Examiner*—Frank T. Yost
*Attorney, Agent, or Firm*—Browdy and Neimark

[57] ABSTRACT

An apparatus for dividing strip material, in particular strip-shaped scrap resulting from edge-trimming of rolled strip and metal sheet, comprises at least one pair of mutually co-operating cutters (18, 18a), between which the strip material (14) is fed and which are arranged to penetrate the strip material from mutually opposite sides. The two cutters in each co-operating pair are mutually substantially parallel at the moment of their penetration into the strip material. The one cutter (18) in each pair is arranged to engage the strip material slightly in front of the second cutter (18a), as seen in the direction of movement of the strip material, and then to move away from the second cutter in the direction of movement of the strip material, such that the part of strip material located in front of the cutters is separated from the remainder of the strip material by a combined cutting and tearing operation.

11 Claims, 2 Drawing Figures

APPARATUS FOR DIVIDING STRIP MATERIAL

The present invention relates to an apparatus for dividing strip material, said apparatus comprising at least one pair of mutually co-operating cutters between which said strip material is continuously advanced and which are arranged to penetrate said material on respective opposite sides thereof. The apparatus is particularly, although not exclusively, intended for use when collecting scrap formed while edge-trimming rolled strip and metal sheet.

It is previously known that handling of scrap formed when edge-trimming rolled strip and metal sheet can be facilitated by dividing or "chewing" the long strips formed during said edge-trimming operation, thereby to reduce the volume of the scrap. To this end there is normally used radial-type chewers which have at least one stationary cutter and at least two movable cutters which are mounted on a rotatable roller. The strip to be divided is fed radially in towards the rotating roller, severing of the strip occurring between a movable cutter and the fixed cutter when said movable cutter passes by the fixed cutter, which is located adjacent the movement path of the movable cutter. The disadvantages with these prior art chewers is that their capacity is not sufficiently high to enable the chewers to cope with all the scrap formed in modern metal-strip or metal-sheet mills, when these operate at their maximum speed or at a speed near said maximum. Because of the low capacity of known chewers, the rolling speed of the rolling mill must be maintained at 30-50% beneath their maximum roll speed, which greatly decreases the production rate. It is also known to use chewers which comprise two rotatable rolls and steel cutters mounted thereon. In these chewers the cutters must be ground to special requirements and be very precise in order for the chewers to operate satisfactorily. This results in high maintenance costs. The cutters of these chewers rotate at mutually the same peripheral velocities.

Further, the conventional chewers are extremely noisy, which is a great disadvantage to those persons working in the rolling mill. Although sound-dampening covers can be placed over the chewers, this can normally only be done with great difficulty, since they must be placed beneath the strip or plate, close to the cutting location, where available space is very limited.

The main object of the invention is to provide an apparatus for dividing strip material, particularly for dividing up scrap formed when edge-trimming metal strip and metal sheet, which is able to operate at high speeds and which is considerably quieter than previously known apparatuses.

This object is achieved with an apparatus according to the invention which comprises at least one pair of mutually co-operating cutters, between which the strip material is fed and which are arranged to penetrate the material from mutually opposite sides, the apparatus being characterized in that the two cutters in each pair are mutually substantially parallel at the moment of their penetration into the strip material, and that the one cutter in each pair is arranged to engage the strip material slightly in front of the second cutter as seen in the direction movement of the strip material, and then to move away from the second cutter in the direction of movement of the strip material, such that the part of strip material located in front of the cutters is separated from the remainder of the strip by a combined cutting and tearing action.

Because, in accordance with the invention, at least one cutter moves substantially in the direction of movement of the strip material, the strip feed is facilitated to such an extent that a higher working speed, and therewith a higher capacity, can be reached than was possible with the previously known devices. This increase in capacity is particularly high in those cases when both cutters in the co-operating pair of cutters move substantially in the direction of movement of the strip material, whereby feeding of the material to be chopped up or divided is considerably facilitated. Because one cutter moves away from the other cutter during the dividing operation, whereby the part of the strip material located in front of the cutters is separated by a combined cutting and tearing operation, there is obtained a considerable reduction in the noise level of the apparatus.

The aforementioned advantages are obtained owing to the fact that the apparatus according to the invention operates in accordance with a novel working principle, namely that the metal strip is divided into pieces by means of a combined cutting and tearing operation. This novel working principle also greatly reduces the wear on the apparatus, since it is not subjected to impact forces, or only to substantially smaller impact forces. Neither need the cutters be ground to a special specification, which is necessary in the previously known apparatuses having two rotatable rollers, and they may have the form of indexible bits, thereby greatly facilitating the exchange of cutting edges and reducing maintenance costs.

Figure 2:
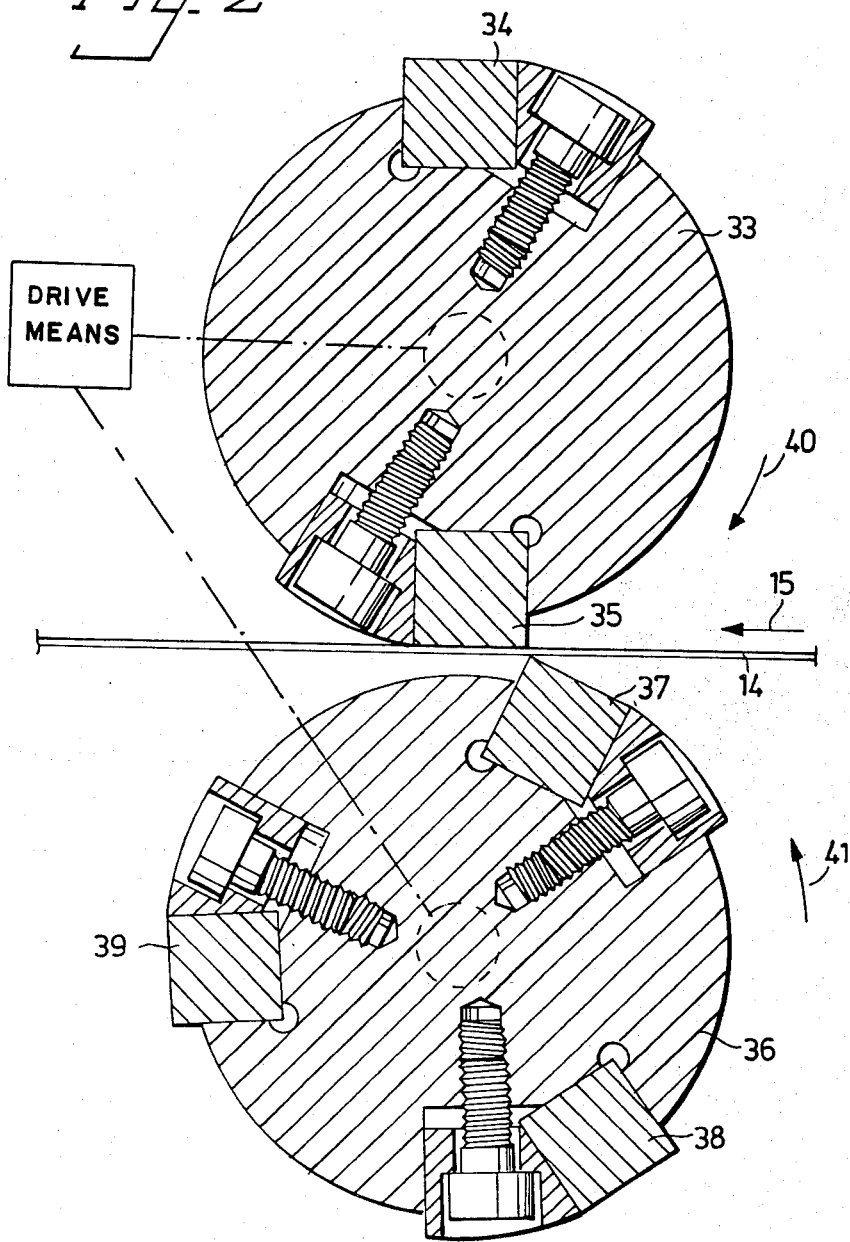

Two exemplary embodiments of the invention will now be described with reference to the accompanying drawings, in which FIG. 1 is a cross-sectional view of one embodiment of the apparatus according to the invention, having two rotatable rollers both of which are provided with three steel cutters; and FIG. 2 illustrates a second embodiment of the apparatus according to the invention, having two rotatable rollers of which one is provided with two steel cutters and the other with three steel cutters.

In FIG. 1 there is illustrated an apparatus for dividing strip material and comprising two rollers 10,11, each of which is mounted for rotation on a respective shaft 12,13. The shafts 12,13 extend perpendicularly to the plane of the figure. A strip 14 obtained when edge-trimming roll d metal sheet material is fed between the rollers 10,11. The direction of feed is indicated by the arrow 15. The manner in which the rollers 10,11 are journalled and driven has not been illustrated, since the structural elements and devices required therefor are of a conventional type and do not form part of the present invention. Neither have the means required for edge-trimming the rolled sheet material and guiding the resulting scrap strip been illustrated for the same reason.

The upper roller 10 is arranged to be rotated clockwise, as shown by the arrow 16, and is provided with three steel cutters 17,18,19, which are mounted in the roller in a manner such that the trailing edge of each cutter projects slightly beyond the cylindrical surface of the roller. Each of the cutters is held in the roller by means of a respective clamp 20, 21 and 22, said clamps having the form of wedges and being held on the roller by means of a respective screw 23, 24 and 25. The wedge-shaped clamps are arranged in pockets so formed that said clamps abut one side of the pocket and one side of a respective cutter. The clamps extend radially out to the other edge of the associated cutter. Clearances 26, 27 and 28, respectively, are arranged between the lower part of the clamps and the bottom of the pockets in the roller, in which the clamps are located, such as to enable the clamps to be drawn into the roller by means of screws to an extent sufficient to provide sufficient clamping force for the cutters in the roller. The roller is also provided with axially extending clearances 29,30,31 at the bottom of each pocket to enable indexible cutters to be used.

The lower roller 11 is arranged for rotation in a counter clockwise direction, as shown by the arrow 32, and is, in other respects, constructed in the same manner as the upper roller. The roller 11 has three steel cutters 17a, 18a, 19a. One difference, however, is that the working diameter of the lower roller-cutter-unit is approximately 10% smaller than the working diameter of the upper roller-cutter unit.

The cutters are arranged equi-angularly in the rollers 10,11. The two rollers 10,11 are arranged to rotate synchronously at mutually the same speed of rotation, but as the upper roller is larger, its surface moves at a higher velocity as noted below. Because the rollers rotate at the same speed, the cutters in the upper roller will rotate at a slightly higher peripheral velocity than the cutters in the lower roller, since the upper roller-cutter-unit has a somewhat larger working diameter. The upper roller is so adjusted in relation to the lower roller that the cutters in the upper roller lie somewhat in front of the cutters in the lower roller during a separating operation.

In the FIG. 1 embodiment each roller is provided with three cutters of square cross section. The rollers, however, may equally as well be provided with 1,2,4 or any other suitable number of cutters. If several cutters are arranged on each roller, said cutters must be equi-angularly arranged thereon.

In the FIG. 2 embodiment the upper roller 33 is provided with two cutters 34,35 and the lower roller 36 with three cutters 37,38,39. The cutters are secured to the rollers in the same way as that described with reference to FIG. 1. The upper roller is arranged for rotation in a clockwise direction and the lower roller in a counterclockwise direction, as shown by means of the arrows 40,41. In this embodiment, however, the roller-cutter-units have mutually the same working diameters and are arranged to rotate at mutually different speeds; the upper roller must have the higher speed. The ratio between the speeds of revolution of the rollers in the FIG. 2 embodiment must be 3:2, in order for the cutters on the upper roll to co-operate with the cutters on the lower roller.

In both of the illustrated embodiments both cutters in each pair of co-operating cutters move during a separating operation substantially in the direction of movement of the strip material, thereby facilitating the guiding and feeding of the strip, and the upper cutters move at a higher velocity than the lower cutters, those cutters moving at the higher velocity constantly being located, during a dividing operation, in front of those cutters which move at the lower velocity. The rollers are arranged at such a distance apart that the strip to be chewed-up is unable to pass between the rollers without the edges of the cutters biting into said strip. Thus, at the beginning of a dividing operation, the two mutually co-operating cutters penetrate the strip close to one another and from opposite sides of said strip, said strip being partially severed thereby. As the dividing operation proceeds, the distance of the leading cutter from the trailing cutter increases, whereby that part of the strip located in front of the cutters is torn from the remaining part of said strip.

Although only two embodiments of the invention have been described and illustrated, it will be understood that many modifications and variations are possible within the scope of the invention. Thus, the rollers of the first embodiment can be arranged to rotate at different speeds and may also be provided with a different number of cutters. The cutters may also have a form different to the illustrated form, e.g. may have in cross section the shape of an isosceles triangle, and may be mounted on the rollers in a manner different to that illustrated. When the rollers have different working diameters, the difference may be greater or smaller than the 10% difference aforementioned. The positions of the rollers may also be changed, so that the cutters which move at the greater speed lie beneath the strip.

The term "strip" as used here also includes rod-like material and wire, and the described apparatus is also suitable for dividing rod-like and wire-like material.

I claim:

1. An apparatus for dividing strip material, comprising at least one pair of mutually co-operating cutters, between which the strip material is fed and which are arranged to penetrate said material from mutually opposite sides, characterized in that the two cutters in each pair are mutually substantially parallel at the moment of their penetration into the strip material, and that the one cutter in each pair is arranged to engage the strip material slightly in front of the second cutter as seen in the direction of movement of the strip material, and then to move away from the second cutter in the direction of movement of said strip material, such that the part of strip material located in front of the cutters is separated from the remainder of said strip by a combined cutting and tearing operation; wherein the cutter arranged to move away from the other cutter is mounted on a body which is arranged for rotation about an axis which is substantially perpendicular to the direction of movement of said strip material and which is spaced from said material; wherein the cutters of each pair are each mounted on a respective roller and said rollers are arranged to rotate in a direction such that the cutters, during a dividing operation, move substantially in the direction of movement of said strip material, one cutter during said dividing operation being located in front of the other and moving at a greater peripheral velocity than said other cutter; wherein the cutters comprise steel rods of square cross section, and said rods are removably mounted in the rollers in a manner such that the cutter moving at the higher peripheral velocity has its rear, outer edge, as seen in the direction of rotation of the associated roller, and the cutter moving at the lower peripheral velocity has its leading, outer edge, as seen in the direction of rotation of the associated roller, projecting out beyond the cylindrical surface of the associated roller, said outwardly projecting edges of the cutters being used to divide said strip.

2. An apparatus for severing strip material into short lengths, comprising at least one pair of mutually co-operating first and second cutters each having an elongate, substantially straight cutting edge, said first and second cutters being disposed on opposite sides of a path along which the strip material is fed continuously in its longitudinal direction, and driving means coupled to said first and second cutters for periodically moving their cutting edges into penetrating engagement with the strip material from opposite sides thereof and subsequently moving the cutting edges substantially in the direction of feed of the strip material, said first and second cutters being arranged to have their cutting edges extending substantially mutually parallel at the instant of their engagement with the strip material and the cutting edge of said first cutter being arranged to engage the strip material slightly in front of the cutting edge of said second cutter as seen in the direction of movement of the strip material and said driving means being arranged to move the cutting edge of said first cutter at a greater velocity than the cutting edge of said cutter as seen in the direction of movement of the strip material, so that the cutting edge of the first cutter is moved away from the cutting edge of the second cutter in the direction of movement of the strip material, whereby the part of strip material located in front of the cutters is separated from the remainder of the strip material by a combined cutting and tearing operation.

3. An apparatus as claimed in claim 2, wherein said first cutter is mounted on a body which is arranged for rotation about an axis which is substantially perpendicular to the direction of movement of the strip material and which is spaced from the feed path of the strip material.

4. An apparatus as claimed in claim 2, wherein said first and second cutters are mounted on a first roller and a second roller, respectively, arranged for rotation in mutually opposite directions about respective axes, which are mutually parallel and substantially perpendicular to the direction of movement of the strip material and located on opposite sides of and spaced from the feed path of the strip material, said first roller being arranged to impart a greater peripheral velocity to said first cutter than said second roller to said second cutter.

5. An apparatus as claimed in claim 4, wherein said first and second rollers are arranged for rotation at the same speed and said first cutter is mounted on said first roller so as to have its cutting edge located at a greater radial distance from the axis of rotation of said first roller than the radial distance of the cutting edge of said second cutter to the axis of rotation of said second roller.

6. An apparatus as claimed in claim 4, wherein said first roller is arranged to be rotated at a higher speed than said second roller, and the radial distance between the cutting edge of said first cutter and the axis of rotation of said first roller is substantially the same as the radial distance between the cutting edge of said second cutter and the axis of rotation of said second roller.

7. An apparatus as claimed in claim 6, wherein a plurality of cutters are mounted equi-angularly on said second roller and a smaller number of cutters are mounted equi-angularly on said first roller, and the different speeds of rotation of said first and second rollers are such that the cutters mounted thereon form pairs of mutually co-operating first and second cutters engaging the strip material from opposite sides thereof.

8. An apparatus as claimed in claim 4, wherein a plurality of cutters are mounted equi-angularly on each of said first and second rollers to form several pairs of mutually co-operating first and second cutters, the number of cutters being the same on said first and second rollers.

9. An apparatus as claimed in claim 4, wherein said first and second cutters each comprise a steel rod of square cross section removably mounted in a said first roller and said second roller, respectively, in a manner such that said first cutter has its rear, outer edge, as seen in the direction of rotation of said first roller, projecting out beyond the circumferential surface of said first roller to form the cutting edge of said first cutter, and said second cutter has its leading, outer edge, as seen in the direction of rotation of said second roller, projecting out beyond the circumferential surface of said second roller and forming the cutting edge of said second cutter.

10. An apparatus for dividing strip material into short lengths comprising:
a first roller having at least one cutter element along the periphery thereof,
a second roller having at least one cutter element along the periphery thereof,
said rollers being provided in peripheral surface facing relation to define a gap therebetween through which is fed strip material to be divided,
means to drive said first roller in a clockwise direction at a first peripheral surface rate and said second roller in a counter-clockwise direction at a second peripheral surface rate such that the first peripheral surface rate is greater than the second peripheral surface rate, and such that the trailing edge of said at least one cutter element along the periphery of said first roller repeatedly cooperates with the leading edge of said at least one cutter element along the periphery of said second roller, said cutters cooperating and said rollers cooperating to constitute means to first cut and then pull apart strips to be divided,
said at least one cutter element of said first roller having a generally flat strip-engaging surface and a cutting edge corresponding to the trailing edge of said surface, and clamping means for said cutter element,
said at least one cutter element of said second roller having a generally flat strip-engaging surface and a cutting edge generally corresponding to the leading edge of said surface, and clamping means for said cutter element.

11. Apparatus as claimed in claim 10, wherein said clamping means for said at least one cutter element of said first roller is located adjacent the leading edge of the flat surface of said cutter; and said clamping means for said at least one cutter element of said second roller is located adjacent the trailing edge of the generally flat surface of said cutter.

* * * * *